Oct. 4, 1960 W. L. MANN 2,955,004
THRUST BEARING
Filed Feb. 26, 1959

INVENTOR
WILLIAM L. MANN
Elliott & Pastoriza
ATTORNEYS

United States Patent Office 2,955,004
Patented Oct. 4, 1960

2,955,004

THRUST BEARING

William L. Mann, 36 Wistaria Drive, Arcadia, Calif.

Filed Feb. 26, 1959, Ser. No. 795,655

8 Claims. (Cl. 308—227)

This invention relates generally to bearings and more particularly to an improved thrust bearing capable of withstanding large loads and rugged treatment such as encountered in oil well drilling operations.

It is a primary object of this invention to provide an extremely rugged thrust bearing capable of supporting loads of the order of 100,000 pounds at revolutions of the order of 200 per minute.

More particularly, it is an object of this invention to provide an improved thrust bearing for use in oil well drilling operations which is extremely long lived notwithstanding the presence of abrasive particles in mud and other environmental fluids.

Another important object is to provide a thrust bearing having a completely open axial passage for circulating mud or the like while enabling one pipe or cylindrical member to be rotated relative to another.

Briefly these and many other objects and advantages of the present invention are attained by providing a bearing race in the form of a tubular member having a central cylindrical bore. First and second bearing members are respectively received in the opposite ends of the bore and connect respectively to pipes or other structures between which thrust is present. Within the cylindrical bore of the bearing race there are provided roller means preferably in the form of large rollers disposed circumferentially about the inner wall of the bore and mounted for rotation about axes lying in a common horizontal plane normal to the axis of the bore and intersecting this axis at a common point. By this arrangement, the bearing members themselves may be in the form of cylindrical pipes or the like, the annular ends of which engage opposite diametrical portions of the rollers so that a straight through axial passage exists in the bearing structure.

A better understanding of a preferred embodiment of the invention as well as further features and advantages thereof will be had by now referring to the accompanying drawings in which.

Figure 1:
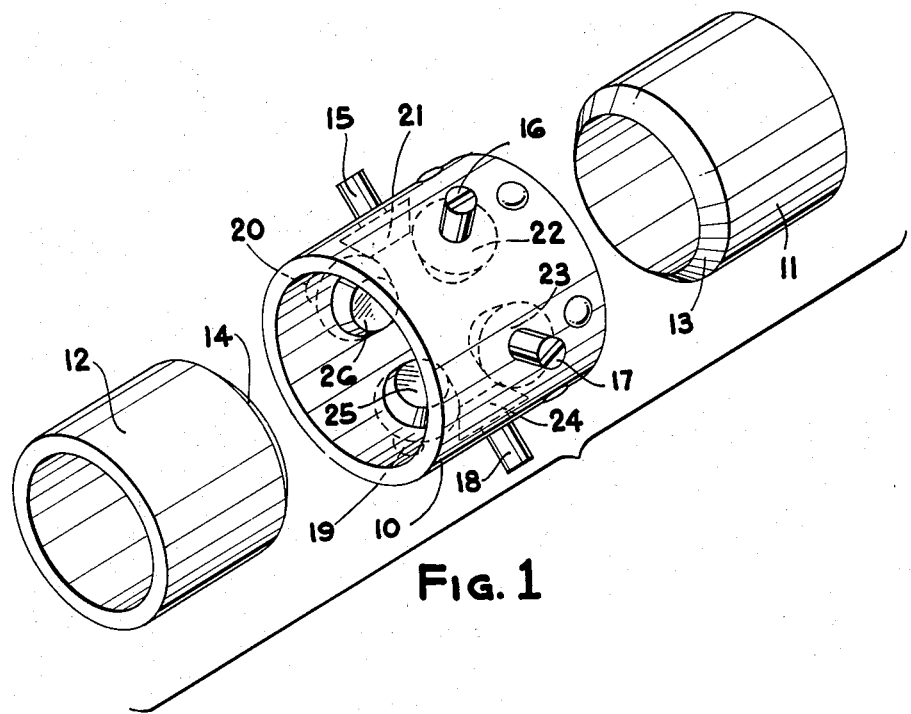
Figure 1 is an exploded perspective view of a preferred type of thrust bearing constructed in accordance with the present invention.

Referring first to Figure 1, there is illustrated a bearing race 10 in the form of a short section of cylindrical tube of dimensions corresponding substantially to drill pipe or other tools employed in an oil well drilling operation. The race 10 is of heavy metallic construction and is arranged to receive first and second bearing members 11 and 12 in its opposite ends. The bearing members 11 and 12 terminate, respectively, in opposed annular beveled bearing surfaces 13 and 14, respectively.

The bearing race itself is provided with a plurality of side bores circumferentially spaced about its central peripheral portion for receiving shafts 15, 16, 17, 18, 19, and 20. These shafts in turn serve to journal roller means, respectively, in the form of rollers 21, 22, 23, 24, 25, and 26 indicated in dotted lines in Figure 1. By this arrangement, the rollers are rotatably mounted adjacent the inside peripheral wall of the race member 10 with their axes of rotation all lying in a common plane normal to the axis of the bearing race 10 and intersecting in a common point on said axis.

Figure 2:
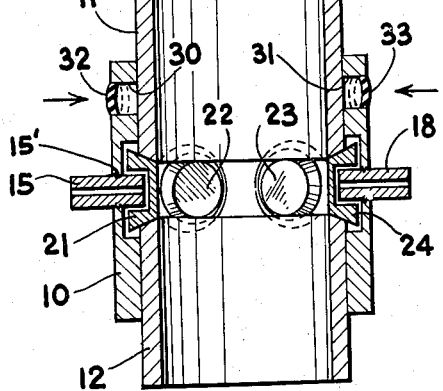
Figure 2 is a cross sectional view of the thrust bearing of Figure 1 in assembled condition; and, Figure 3 is an enlarged view partly broken away of one of the rollers and mounting means therefor.
Figure 3:
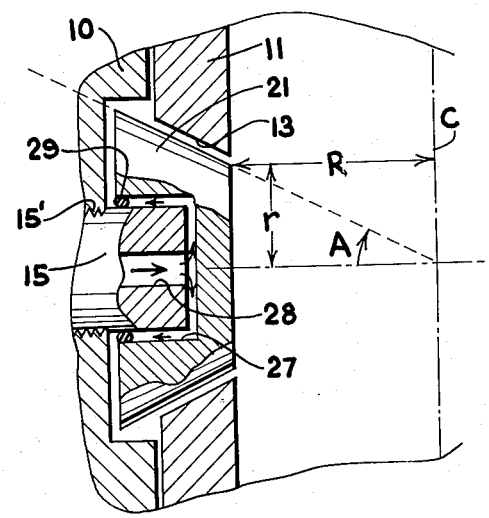

As indicated more clearly in Figures 2 and 3, each of the rollers are beveled and are disposed between the opposing annular beveled bearing surfaces of the bearing members 11 and 12. There is thus provided a straight through passage for circulating mud or other fluid.

Referring particularly to Figure 3, each of the shafts such as the shaft 15 may be provided with threads 15' so that their inward extent may be adjusted by threading or unthreading the shafts within the side bores of the race. Each of the rollers themselves such as the roller 21 includes a central bore or cavity 27 journaled about the exterior inward end of its corresponding shaft such as the shaft 15. The shaft in turn may include an axial passage 28 for passing lubricating oil between the journaled surfaces of the shaft and roller as indicated by the arrows. An annular O-ring 29 may be provided at the base of each of the rollers for closing the cavity 27 and permitting a suitable oil pressure to exist therein. After oil has been forced into the cavity 27, the exterior of the passage 28 is plugged as indicated schematically in Figure 2.

As shown in both Figures 1 and 2, the bearing race 10 also includes openings such as indicated in Figure 2 at 30 and 31 respectively closed by flexible diaphragms 32 and 33. By this arrangement, the pressure between the exterior of the members 11 and 12 and the interior cylindrical portions of the bearing race 10 may be equalized with the pressure of fluid or the like exterior to the bearing race. This feature is important where the thrust bearing is employed in deep well applications since the exterior fluid mud pressure is extremely high. By equalizing the interior pressure of the thrust bearing the tendency for differential pressures to force coarse particles and the like into the bearing surfaces is minimized.

The operation of the invention will be apparent from the above description. After the members 11 and 12 are telescopically assembled within the opposite open ends of the race 10, each of the shafts 15 through 20 may be individually adjusted to insure contact between the beveled surfaces of the rollers and the annular beveled surfaces at the ends of the bearing members 11 and 12. It will be evident from Figure 2 that as a consequence of the beveled surfaces, inward movement of any one of the roller shafts will tend to cause a tighter engagement between the diametrically opposite points of the corresponding roller and the opposing beveled ends of the bearing members.

Suitable lubricating oil may be forced into the various passages of the shafts and the ends of the shafts thereafter plugged as described heretofore. The entire assembly may then be secured at a suitable joint in oil well pipes or in other tools in which it is desired to employ the thrust bearing and lowered into the bore hole in a conventional manner.

Because of the relatively close fit between the bearing members 11 and 12 with the cylindrical interior of the race 10, coarse particles in the circulating mud or other environmental fluids are prevented from reaching the actual rollers themselves. Moreover, by making the rollers relatively large any of the smaller coarse particles that should enter between the bearing surfaces will not seriously affect the operation of the device.

With particular reference to Figure 3, it will be noted that the tangent of the angle A of the bevel with respect to the axis of the rollers is equal to the smaller radius $r$ of the roller as measured from its axis to the point on its bearing surface in engagement with the innermost point of the members 11 and 12 divided by the radius $R$ of the members 11 and 12. By forming the bevel angle in this manner, there will be complete rolling contact throughout the entire beveled areas in engagement. In actual operation the bearing race 10 will be rotating at one-half the relative rotational speed of the members 11 and 12.

While a preferred embodiment of the invention has been described in connection with oil well drilling operations, it will be evident that there will be many other applications for the thrust bearing of this invention. The invention, accordingly, is not to be thought of as limited to the particular embodiment shown and described.

What is claimed is:

1. A thrust bearing comprising: a bearing race having a central opening passing therethrough; first and second cylindrical members telescopically receivable at opposite ends of said bearing race; and at least three individual rollers disposed between the opposing ends of said members and mounted circumferentially about the wall of said race for rotation about axes lying in a common horizontal plane normal to the axis of said bearing race and intersecting said axis in a common point, said bearing race rotating about its axis at one-half the rate of relative rotation of said first cylindrical member relative to said second cylindrical member.

2. The subject matter of claim 1, in which said cylindrical members are tubular in shape so that fluid may pass axially through said members and bearing race.

3. A thrust bearing comprising, in combination: a first cylindrically shaped bearing member terminating at one end in a first annular beveled bearing surface; a second cylindrically shaped bearing member terminating at one end in a second annular beveled bearing surface similar to said first annular beveled bearing surface; a cylindrical bearing race in the form of a tubular member having an inside diameter corresponding substantially to the outside diameters of said first and second bearing members to receive said members in its opposite ends with said first and second bearing surfaces in opposing relationship; a plurality of beveled rollers; and mounting means mounting said rollers to said bearing race between said first and second beveled surfaces for rotation adjacent the inside peripheral surface of said race about axes lying in a common plane normal to the cylindrical axis of said race and intersecting said cylindrical axis in a common point, said bearing race rotating about its axis at one-half the rate of relative rotation of said first cylindrical member relative to said second cylindrical member.

4. The subject matter of claim 3, in which the tangent of the angle of the beveled surfaces of said rollers with respect to the axes of rotation of said rollers is equal to the radius of said rollers as measured from their axes to the contact points of their beveled surfaces with the inside annular beveled portion of said annular beveled members divided by the inside radius of said annular beveled members.

5. The subject matter of claim 3, in which said mounting means include side bores passing normally through the surface of said race at uniformly spaced circumferential points; and shafts passing through said bores, said beveled rollers being journaled on said shafts.

6. The subject matter of claim 5, in which said shafts are threaded into said bores so that the distance of said rollers from said cylindrical axis may be individually varied.

7. The subject matter of claim 5, in which said shafts include oil receiving passages for passing lubricating oil between said rollers and shafts.

8. The subject matter of claim 3, in which said race includes at least one opening passing from its exterior to the annular area between its internal surface and the exterior surface of one of said members; and a flexible diaphragm covering said opening whereby pressure in said area is equalized to the pressure exterior of said race.

References Cited in the file of this patent

UNITED STATES PATENTS

| | | |
|---|---|---|
| 751,665 | Maples | Feb. 9, 1904 |
| 2,057,213 | Skyiepal | Oct. 13, 1936 |
| 2,675,713 | Acker | Apr. 20, 1954 |
| 2,718,440 | Brinkman | Sept. 20, 1955 |
| 2,861,780 | Butler | Nov. 25, 1958 |